United States Patent
Hennings et al.

[11] Patent Number: 6,072,688
[45] Date of Patent: Jun. 6, 2000

[54] CERAMIC MULTILAYER CAPACITOR

[75] Inventors: Detlev Hennings, Aachen; Peter Hansen, Aachen-Walheim, both of Germany

[73] Assignee: U.S. Philips Corporation, New York, N.Y.

[21] Appl. No.: 09/166,433

[22] Filed: Oct. 5, 1998

[30] Foreign Application Priority Data

Oct. 8, 1997 [EP] European Pat. Off. ............ 97203123
Dec. 10, 1997 [EP] European Pat. Off. ............ 97203876

[51] Int. Cl.[7] .......................... H01G 4/06; H01G 4/228; C04B 35/46
[52] U.S. Cl. .............. 361/311; 361/321.5; 501/134; 501/137
[58] Field of Search .......................... 361/311, 312, 361/313, 321.1, 321.2, 321.3, 321.4, 321.5; 501/134, 135, 136, 137, 138

[56] References Cited

U.S. PATENT DOCUMENTS

| | | | |
|---|---|---|---|
| 5,319,517 | 7/1994 | Nomura et al. | 361/321.4 |
| 5,397,753 | 3/1995 | Nishiyama et al. | 501/138 |
| 5,432,136 | 7/1995 | Shibata et al. | 501/138 |
| 5,510,305 | 4/1996 | Sano et al. | 501/138 |
| 5,604,166 | 2/1997 | Sasaki et al. | 501/137 |
| 5,635,435 | 6/1997 | Shibata | 501/138 |
| 5,659,456 | 8/1997 | Sano et al. | 361/321.4 |
| 5,763,346 | 6/1998 | Minamikawa et al. | 501/135 |
| 5,818,686 | 10/1998 | Mizuno et al. | 361/311 |
| 5,822,176 | 10/1998 | Sano et al. | 361/321.4 |
| 5,841,626 | 11/1998 | Sano et al. | 361/321.5 |

*Primary Examiner*—Dean A. Reichard
*Assistant Examiner*—Anthony Dinkins
*Attorney, Agent, or Firm*—Norman N. Spain

[57] ABSTRACT

The invention relates to a ceramic multilayer capacitor having a number of ceramic layers on the basis of a doped $(Ba,Ca)[Ti,Zr]O_3$ as well as a number of electrode layers of Ni, the ceramic layers and the electrode layers being alternately stacked to form a multilayer structure which is provided with electric connections at two side faces, said electric connections being connected to a number of the electrode layers. The invention is characterized in that the composition of the main component of the doped $(Ba,Ca)[Ti,Zr]O_3$ corresponds to the formula $$(Ba_{1-x}Ca_x)(Ti_{1-a-b-y}Zr_yMn_aMo_bA_c)_kO_{3-\delta}$$

wherein:
  $0.00 \leq x \leq 0.05$
  $0.10 \leq y \leq 0.25$
  $0.00 < a \leq 0.01$
  $0.00 < b \leq 0.01$
  $0.00 \leq c \leq 0.01$
  $0.99 < k \leq 0.999$ and wherein A stands for at least one element selected from the series including Y, Ho, Dy, Er, Yb, Ga, Ni, Mg, Zn and Al, the elements Y, Ga and Zn being preferred. The invention also relates to a ceramic composition of this kind as well as to a method for the manufacture of the above-mentioned ceramic multilayer capacitors.

14 Claims, 1 Drawing Sheet

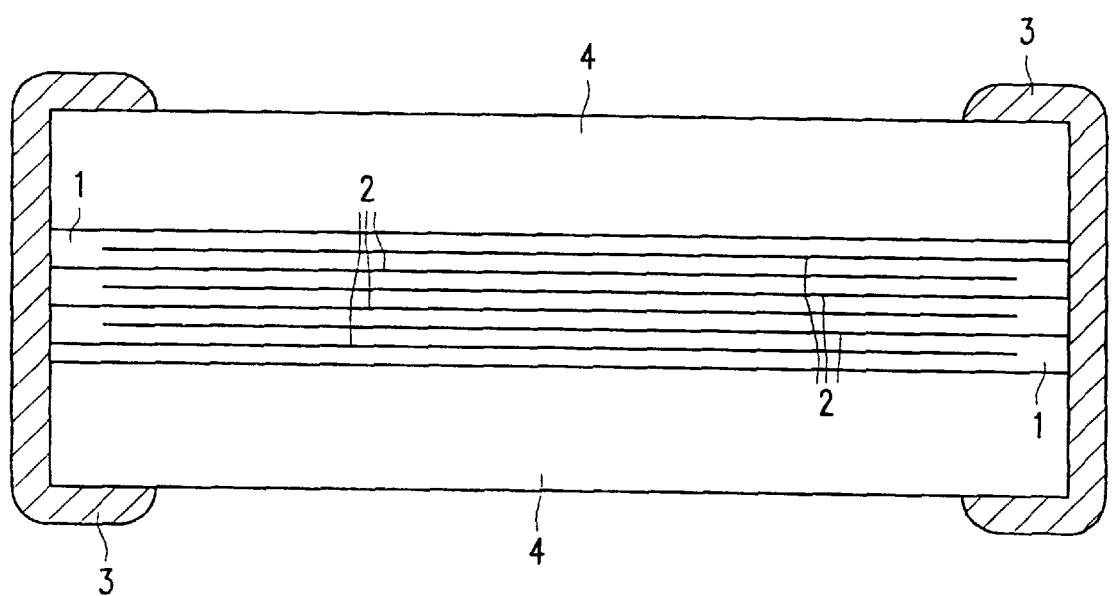

CERAMIC MULTILAYER CAPACITOR

BACKGROUND OF THE INVENTION

The invention relates to a ceramic multilayer capacitor comprising a number of ceramic layers on the basis of a doped $(Ba,Ca)[Ti,Zr]O_3$ as well as a number of electrode layers of Ni, the ceramic layers and the electrode layers being alternately stacked to form a multilayer structure which is provided with electric connections at two side faces, said electric connections being connected to a number of the electrode layers. The invention also relates to a ceramic material which can suitably be used in a ceramic multilayer capacitor. The invention further relates to a method of manufacturing a ceramic multilayer capacitor.

Ceramic multilayer capacitors of the type mentioned in the opening paragraph are known per se. They are described, inter alia, in U.S. Pat. No. 5,319,517. This patent discloses, more particularly, a multilayer capacitor whose ceramic layers are made predominantly of a material which is based on doped $(Ba,Ca,Sr)[Ti,Zr]O_3$. This material has a so-called perovskite structure. In the case of the known material, specific quantities of Ca ions and Sr ions are substituted at the Ba sites (so-called A-sites) of the perovskite structure, and a specific quantity of Zr ions is substituted at the Ti sites (so-called B-sites). The electrode layers of the known capacitor consist predominantly of Ni. In the manufacture of the capacitor, dopants including the metals Mn, Y, V and W and/or compounds which convert to their oxides upon firing are added to a calcined and milled powder of $(Ba,Ca,Sr)[Ti,Zr]O_3$. Sintering aids are also added in order to reduce the minimum sintering temperature of the ceramic material. A relatively low sintering temperature is necessary to preclude that the Ni of the electrode layers melts during the sintering process.

The known ceramic multilayer capacitor appears to have a disadvantage. It has been found that, in practice, the indicated composition does not lead to optimum properties of the capacitor. It has especially been shown that the ever increasing requirements in terms of life time of the capacitor cannot always be met by the known capacitors.

SUMMARY OF THE INVENTION

It is an object of the present invention to obviate the above-mentioned disadvantage. The invention more particularly aims at providing a ceramic multilayer capacitor comprising electrode layers of Ni, which show a very high lifetime, a high dielectric constant, a high insulation resistance and a suitable temperature characteristic. The invention also provides a ceramic material which can suitably be used in a ceramic multilayer capacitor having a very high lifetime, a high dielectric constant, a high insulation resistance and a suitable temperature characteristic. A further object of the invention is to provide a method of manufacturing a ceramic multilayer capacitor having a high lifetime, a high dielectric constant, a high insulation resistance and a suitable temperature characteristic.

These and other objects of the invention are achieved by a ceramic multilayer capacitor of the type mentioned in the opening paragraph, which is characterized in that the composition of the main component of the doped $(Ba,Ca)[Ti,Zr]O_3$ corresponds to the formula $$(Ba_{1-x}Ca_x)(Ti_{1-a-b-c-y}Zr_yMn_aMo_bA_c)_kO_{3-\delta}$$

wherein:

$0.00 \leq x \leq 0.05$
$0.10 < y \leq 0.25$
$0.00 < a \leq 0.01$
$0.00 < b \leq 0.01$
$0.00 \leq c \leq 0.01$
$0.99 < k < 0.999$ and wherein A stands for at least one element selected from the group consisting of Y, Ho, Dy, Er, Yb, Ga, Ni, Mg, Zn and Al.

In many experiments, which led to the present invention, the inventors have found in highly accelerated life tests (HALT) that capacitors of the above type show a surprisingly high lifetime and a high reliability. It moreover appeared that the invented capacitors showed a high dielectric constant $\epsilon$ (15.000 and higher), a relatively low loss factor (5% or less) and a relatively high insulation resistance. First experiments have shown that the temperature dependence of the dielectric constant (=temperature characteristic) meets the so-called Y5V-standard of the EIA.

The reason for the very high lifetime is not fully clear at the moment. The inventors however strongly believe that the formation of intricate Mn-Mo complexes is responsible for this advantageous effect. Such donor/acceptor-complexes are assumed to preclude the formation of so-called O-vacancies in the $BaTiO_3$ structure of the grains of the dielectric material. It is known that the presence of such O-vacancies can lower the insulation resistance of the dielectric material, which results in a reduction of the lifetime of the ceramic multilayer capacitor. The above mentioned donor/acceptor complexes could form strong stress centres, which causes a reduction of the mobility of the O-vacancies. The presence of W and/or V might have a negative effect on the formation or presence of such complexes, thus leading to a relatively lower lifetime, as shown in U.S. Pat. No. 5,319,517.

The incorporation of dopants in the $BaTiO_3$ crystal structure is necessary to render the inventive material suitable for use as a dielectric material in a ceramic multilayer capacitor. In the present case, Ca ions are incorporated on the Ba or acceptor sites and Zr, Mn and Nb ions are incorporated on the Ti or donor sites of the $BaTiO_3$ material. It is noted that the indicated quantities of dopants are calculated as parts of the overall quantity of available Ba and Ti sites in this material.

The presence of Ca in the indicated quantities at the Ba sites of the ceramic material is regarded as an essential prerequisite for obtaining properly functioning ceramic multilayer capacitors. The presence of Ca serves to widen the dielectric peak of the ceramic material. A quantity above 0.05 parts of Ca in the ceramic material leads to a dielectric constant of said material which is too low. Moreover, the dielectric losses appear to increase significantly if x>0.05. An optimum compromise between both undesirable effects of a small dielectric peak on the one hand and a low dielectric constant in combination with high dielectric losses on the other hand is achieved if the quantity of Ca at the Ba sites of the ceramic material ranges between 0.03 and 0.045 parts.

The presence of Zr, Mn, Mo and element A in the indicated quantities at the Ti sites of the ceramic material is also regarded as an essential prerequisite for obtaining a properly functioning multilayer capacitor. In contrast to other dopants, the presence of Zr causes the maximum value of the dielectric constant (the Curie point) of $BaTiO_3$ to shift to a higher temperature range. If the quantity of Zr is less than 0.10 parts or more than 0.25 parts, the Curie point is too low or too high, respectively. This leads to too low a dielectric constant at the operating temperature (=room temperature) of the material. If the quantity of Zr ranges between 0.17 and 0.22 parts, the position of the Curie point is optimally chosen.

Mn plays an important part in the sintering of the ceramic material of the multilayer capacitor in accordance with the invention. Said sintering process takes place in a reducing atmosphere. During sintering, reduction of $BaTiO_3$ may occur. This leads to a reduction of the resistance of the ceramic material formed in the sintering process, which results in decrease of the lifetime of the multilayer capacitor. This is undesirable. In experiments it has been established that the presence of a specific quantity of Mn at Ti sites of the ceramic material can preclude this undesirable reduction of the ceramic material. The ability of Mn to protect against reduction occurs, in particular, in the grains of the ceramic material. If the ceramic material contains more than 0.01 parts of Mn, then the dielectric constant becomes too low. An optimum compromise between the desired properties, i.e. of prevention of reduction of the material and a high dielectric constant, is achieved at an Mn quantity which ranges between 0.002 and 0.006 parts.

As stated above, the presence of Mo is also important, inter alia, for the formation of intricate donor-acceptor complexes between Mo and Mn. It is believed that these complexes are responsible for the very high lifetime of the inventive multilayer capacitors. A very small amount of Mo of approximately 0.001 parts already increases the service life of the capacitor. It has been shown that the dielectric material becomes semi-conductive if considerably more than 0.01 parts of Mo are present in said material. The quantity of Mo is preferably chosen to range between 0.002 and 0.0065 parts in order to attain an optimum compromise between the aimed high service life and the undesired semi-conductive properties of the dielectric material. It is noted that the amount of Mo is preferably higher than the sum of the amounts of Mn and A.

Preferably, the doped (Ba,Ca)[Ti,Zr]$O_3$ of the invented multilayer capacitors contains also a small amount of one or more elements selected from the group consisting of Y, Ho, Dy, Er, Yb, Ga, Ni, Mg, Zn and Al. These elements have a fixed valency. With the aid of these elements, an optimization of the temperature characteristic, the dielectric constant and other desired properties can be achieved. However, the total amount of these elements should maximally be 0.01 parts. If more than 0.01 parts is used, then the formation of unexpected phases can occur in the dielectric material. An optimal amount ranges between 0.002 and 0.006 parts. It has been found experimentally that especially the presence of Y, Ga and/or Zn has a positive effect on the lifetime of the invented multilayer capacitor.

As there is an unequal number of (substituted) Ti atoms and (substituted) Ba atoms in the perovskite structure (k is unequal to zero), the number of O atoms is not exactly equal to 3. The deviation from 3 is indicated in the formula by δ. As the number of acceptor atoms is higher than the number of donor atoms, vacancies on sites where O-atoms should be present are formed in the material.

The invention also relates to a novel ceramic composition on the basis of a doped (Ba,Ca)[Ti,Zr]$O_3$. In accordance with the invention, this composition is characterized in that the composition of the main component corresponds to the formula

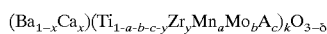

wherein:

$0.00 \leq x \leq 0.05$ $0.10 \leq y \leq 0.25$ $0.00 < a \leq 0.01$ $0.00 < b \leq 0.01$ $0.00 \leq c \leq 0.01$ $0.99 < k < 0.999$ and wherein A stands for at least one element selected from the group consisting of Y, Ho, Dy, Er, Yb, Ga, Ni, Mg, Zn and Al.

Ceramic compositions which correspond to this formula can very advantageously be used in ceramic capacitors, in particular ceramic multilayer capacitors comprising electrode layers of Ni. The metal content of such electrode layers consists for at least 90 wt. %, preferably minimally 98 wt. %, of Ni. For the reasons described hereinabove, preferably also the following applies: $0.03 < x < 0.45$; $0.17 \leq y < 0.22$; $0.002 < a \leq 0.006$; $0.002 < b \leq 0.0065$; $0.002 \leq c \leq 0.006$ and $0.99 < k < 0.999$. Preferably it holds that A stands for Y, Ga and or Zn.

The invention also relates to a method of manufacturing ceramic multilayer capacitors, in which ceramic foils on the basis of a doped (Ba,Ca)[Ti,Zr]$O_3$ are provided with screen-printed electrode layers which are mainly composed of Ni, whereafter the ceramic layers and the electrode layers are alternately stacked to form a multilayer structure which is subsequently calcined and sintered in a reducing atmosphere, after which the multilayer structure is provided with electric connections, which are connected to a number of said electrode layers, characterized in that the composition of the main component of the doped (Ba,Ca)[Ti,Zr]$O_3$ corresponds to the formula

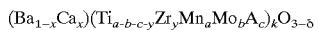

wherein:

$0.00 \leq x \leq 0.05$ $0.10 \leq y \leq 0.25$ $0.00 < a \leq 0.01$ $0.00 < b \leq 0.01$ $0.00 \leq c \leq 0.01$ $0.99 < k < 0.999$ and wherein A stands for at least one element selected from the group consisting of Y, Ho, Dy, Er, Yb, Yb, Ga, Ni, Mg, Zn and Al.

As stated hereinabove, multilayer capacitors in accordance with the invention have a very high lifetime, a high dielectric constant, a high insulation resistance and a suitable temperature characteristic. This applies especially if A stands for Y, Ga and/or Zn.

A first preferred advantageous embodiment of the invented method is characterized in that the doped (Ba,Ca)[Ti,Zr]$O_3$ is prepared by mixing oxides and/or carbonates of the used metals and subsequently calcining and milling this mixture. The doped (Ba,Ca)[Ti,Zr]$O_3$ structure containing Mn, Mo and—if desired—A as dopants on the B-sites is formed during calcining. Said dopants are therefore uniformly distributed within the grains of the main component of the ceramic layers. The use of a sintering aid, preferably $SiO_2$, in an amount of 0.1–1.0 wt. % in the mixture is preferred since it provides the mixture with better sintering properties.

Another preferred advantageous embodiment of the invented method is characterized in that the doped (Ba,Ca)[Ti,Zr]$O_3$ is prepared by means of a sol-gel process. In this embodiment of the invented method, first a colloidal suspension of solid particles in an organic solution is prepared.

In the present case, preferably hydrolyzed metal alkoxide particles in an organic solvent (f.i. an alcohol) are used. After adding a small amount of water (with some acid or hydroxide as a catalyst), hydrolysation of the metal alkoxides takes place. Polycondensation into the desired doped (Ba,Ca)[Ti, Zr]O$_3$ can subsequently occur, usually after increasing the temperature of the suspension. Finally, the solvent is removed, f.i. by means of evaporation. The doped (Ba,Ca)[Ti,Zr]O$_3$ thus obtained shows a maximally uniform distribution of the dopants in the material.

These and other aspects of the invention will be apparent from and elucidated with reference to the embodiments described hereinafter.

BRIEF DESCRIPTION OF THE DRAWING

In the drawing:

FIG. 1 is a schematic, sectional view of a capacitor in accordance with the invention.

It is noted that, for clarity, the parts shown in the FIGURE are not drawn to scale.

DETAILED DESCRIPTION OF THE INVENTION

The invention will now be described in greater detail with reference to the FIGURE of the drawing.

FIG. 1 shows a multilayer capacitor in accordance with the present invention. This capacitor comprises a number of ceramic layers 1 on the basis of a doped (Ba,Ca)[Ti,Zr]O$_3$. The exact composition is $(Ba_{1-x}Ca_x)(Ti_{1-a-b-c-y}Zr_yMn_aMo_bA_c)_kO_{3-\delta}$, wherein $0.00 \leq x < 0.05$; $0.10 \leq y \leq 0.25$; $0.00 < a \leq 0.01$; $0.00 < b \leq 0.01$; $0.00 \leq c \leq 0.01$ and $0.99 < k < 0.999$, and wherein A stands for at least one element selected from the group consisting of Y, Ho, Dy, Er, Yb, Ga, Ni, Mg, Zn and Al.

The capacitor also comprises a number of electrode layers 2 which predominantly consist of Ni. The capacitor additionally has two electric connections 3 which, in this case, are provided on two oppositely located side faces of the capacitor. These connections contain a solderable material, for example copper. In practice, the electrode layers are provided on a ceramic foil by means of screen printing, whereafter a number of these screen printed foils are stacked. As shown in the Figure, the ceramic foils are stacked so that successive electrode layers are connected alternately to the one or the other electric connection.

For clarity, only 6 electrode layers are shown in FIG. 1. In practice, ceramic multilayer capacitors comprise minimally ten and maximally several hundred electrode layers. Their thickness typically ranges from approximately 0.5 to 2.0 micrometers. The thickness of the ceramic foils typically ranges from 2 to 20 micrometers. In practice, the capacitors are provided with a cover layer 4 on the upper side and the lower side of the stacked, printed foils. This cover layer is usually composed of a number of unprinted ceramic foils which, during stacking of the printed foils, are incorporated in the stack.

The ceramic multilayer capacitors in accordance with the invention can be manufactured, either via the classical oxide/carbonate method (first method) or via a sol-gel method (second method).

In the first method, a powder mixture is prepared by mixing powders of oxides and/or carbonates of the desired metals in quantities corresponding to the intended composition. In order to prepare the ceramic materials of the present invention, the following starting materials are used: BaCO$_3$ (SABED), CaCO$_3$ (Merck p.a.), TiO$_2$ (Fuji), ZrO$_2$ (Mel), MnCO$_3$ (Baker), MoO$_3$ (Merck), Al$_2$O$_3$ (Merck), Ga$_2$O$_3$ (Merck-Schuchardt), (CH$_3$COO)$_2$Mg.4H$_2$O(Merck), NiO, Y$_2$O$_3$ (Starck), ZnO (Merck) and RE$_2$O$_3$ (RE stands for Er, Dy, Ho and Yb; Auer-Remy). The average grain size of the starting materials is below 1 micrometer.

The powder mixture thus obtained is suspended in an aqueous solution to which a small quantity of a dispersing agent is added. The suspension is ground in a ZrO$_2$ ball mill for 24 hours, so that powder particles having an average size below 0.4 micrometer are obtained. Subsequently, the powder is dried and calcined in air for several hours at 1100–1250° C. X-ray diffraction shows that this procedure results in the desired, single-phase, doped (Ba,Ca)[Ti,Zr]O$_3$ material having a perovskite structure, according to the present invention.

In the second method, 3 parts of tetrabutyl titanate (TBT—Ti(CH$_4$H$_9$)$_4$) and tetrabutyl zirconate (TBZ—Zr(CH$_4$H$_9$O)$_4$) are both separately diluted with 17 parts of dry (=water-free) isopropanol (C$_3$H$_7$OH). Both alcoholic mixtures are stirred for three hours, while protecting them from water. In accordance with the desired Ba/Zr-ratio, parts of both solutions are mixed and stirred again for three hours, while protecting the mixture from water. The resultant mixture is diluted with 0.15 vol. of pure (water-free) acetic acid (CH$_3$COOH). The sol thus obtained is moisture-sensitive, but can easily be stored at room temperature under dry nitrogen for more than one month.

Water-free Ba-acetate, Ca-acetate, Mn-acetate, ammonium-heptamolybdate and the acetate of one or more of the elements A are mixed in quantities corresponding to the intended composition. This mixture of acetates is dissolved in acetic acid and water (salts/acetic acid/water=1/8/7), while stirring and heating to the boiling point until a clear solution has been obtained.

Subsequently, 1.001 to 1.010 mol of the acetate solution is mixed with the above-mentioned sol in the desired ratio. This mixture is finally stirred until it has become optically clear. The acetate-sol mixture is then spray-dried to obtain a gel powder, which is subsequently calcined into a fine-grain perovskite mixed-crystal powder at 1050–1150° C. in air.

The calcined perovskite material (obtained either by the first or the second method) is ground for about 6 hours in the same mill. The powder thus formed has an average particle size below 0.8 micrometer. A small amount of colloidal SiO$_2$ and a binder solution (PVA) are added to this powder. Subsequently, green, ceramic foils having a thickness of, for example, 40 micrometers are drawn from this powder-binder mixture. Electrode layers are screen-printed onto these folis by means of techniques which are known per se. For this purpose, use is made of a screenprinting paste which contains metal particles which are predominant composed of Ni. The metal content of such a paste consists for at least 90 wt. %, preferably least 98 wt. %, of Ni. The layer thickness of the non-sintered electrode layers is approximately 2 micrometers.

Subsequently, printed foils having a desired size are stacked. The foils are stacked in such a manner that the electrode layers of the even layers and of the odd layers are slightly displaced relative to each other. The stacked foils are uniaxially subjected to a high pressure (approximately 300 bar) at an increased temperature (approximately 80° C.) to form a multilayer structure. This structure is subsequently broken in one direction to form rods and in a second direction (at right angles to the first direction) to form separate multilayer-capacitor bodies. These bodies are sintered in a reducing atmosphere of hydrogen in a water-saturated nitrogen atmosphere at about 1320° C. After sintering, the bodies are annealed in an $O_2$-containing nitrogen atmosphere for about 2 (reoxidation).

Finally, two oppositely located surfaces of the multilayer-capacitor bodies are provided with electric outer connections of copper by means of dip coating. These connections are galvanically reinforced and provided with a solderable NiSn alloy. The mechanical and electrical properties of the ceramic multilayer capacitors thus produced can be subsequently measured.

In a number of experiments, series of multilayer capacitors based on doped $BaTiO_3$ were manufactured as described hereinabove. The composition of the main component of the ceramic layers of the various series corresponds to the formula:

1. $(Ba_{0.96}Ca_{0.04})(Ti_{0.81}Zr_{0.18}Mn_{0.0050}Mo_{0.0025}Y_{0.0025})_{0.0990}O_{3-\delta}$.
2. $(Ba_{0.96}Ca_{0.04})(Ti_{0.81}Zr_{0.18}Mn_{0.0050}Mo_{0.0025}Y_{0.0025})_{0.0995}O_{3-\delta}$.
3. $(Ba_{0.96}Ca_{0.04})(Ti_{0.81}Zr_{0.18}Mn_{0.0050}Mo_{0.0050}Y_{0.0025})_{0.0990}O_{3-\delta}$.
4. $(Ba_{0.96}Ca_{0.04})(Ti_{0.81}Zr_{0.18}Mn_{0.0025}Mo_{0.0025}Ho_{0.0025})_{0.0990}O_{3-\delta}$.
5. $(Ba_{0.96}Ca_{0.04})(Ti_{0.81}Zr_{0.18}Mn_{0.0050}Mo_{0.0025}Zn_{0.0025})_{0.0995}O_{3-\delta}$.
6. $(Ba_{0.96}Ca_{0.04})(Ti_{0.81}Zr_{0.18}Mn_{0.0025}Mo_{0.0025}Ga_{0.0025})_{0.0990}O_{3-\delta}$.
7. $(Ba_{0.96}Ca_{0.04})(Ti_{0.81}Zr_{0.18}Mn_{0.0025}Mo_{0.0025}Al_{0.0025})_{0.0990}O_{3-\delta}$.
8. $(Ba_{0.96}Ca_{0.04})(Ti_{0.81}Zr_{0.18}Mn_{0.0025}Mo_{0.0025}Yb_{0.0025})_{0.0990}O_{3-\delta}$.

Of these series, the following (average) data are measured and given below: the Insulation Resistance IR (in $10^9$ ohm at 25° C. and 100 V; measured after 1 minute), the Curie temperature Tc (°C., before and after annealing, respectively), the dielectric constant $\epsilon$ and the lifetime (HALT circumstances; 140° C. and 13V/micrometer).

| no | IR | Tc | $\epsilon$ | HALT |
|---|---|---|---|---|
| 1. | 22 | 11.8/1.6 | 18200 | >80 |
| 2. | 4 | 27.9/18.9 | 19600 | >80 |
| 3. | 18 | 7.5/1.5 | 16700 | >80 |
| 4. | 26 | 10.0/1.8 | 15900 | >50 |
| 5. | 11 | 15.5/-1.9 | 18400 | >70 |
| 6. | 7 | 19.3/17.1 | 22600 | >70 |
| 7. | 17 | 16.7/11.3 | 18600 | >50 |
| 8. | 10 | 14.2/-1.7 | 16600 | >50 |

From these data, it can be concluded that the multilayer capacitors according to the present invention have a very high lifetime, a high dielectric constant and a high insulation resistance. This holds especially for the ones containing Y, Ga and/or Zn as the A-element. From other measurements, it was concluded that all these multilayer capacitors meet the requirements of the Y5V-characteristic, as defined by the EIA (Electric Industry Association).

We claim:

1. A ceramic multilayer capacitor comprising a number of ceramic layers comprising a doped $(Ba,Ca)[Ti,Zr]O_3$ as well as a number of electrode layers of Ni, the ceramic layers and the electrode layers being alternately stacked to form a multilayer structure which is provided with electric connections at two side faces, said electric connections being connected to the number of the electrode layers, characterized in that a composition of a major portion of the doped $(Ba,Ca)[Ti,Zr]O_3$ corresponds to the formula $$(Ba_{1-x}Ca_x)(Ti_{1-a-b-c-y}Zr_yMn_aMo_bA_c)_kO_{3-\delta}$$

wherein:
$0.00 \leq x \leq 0.05$
$0.10 \leq y \leq 0.25$
$0.00 < a \leq 0.01$
$0.00 < b \leq 0.01$
$0.00 \leq c \leq 0.01$
$0.99 < k < 0.999$ and wherein A is at least one element selected from the group consisting of Y, Ho, Dy, Er, Yb, Ga, Ni, Mg, Zn and Al.

2. A ceramic multilayer capacitor as claimed in claim 1, characterized in that A is at least one member selected from the group consisting of Y, Ga and Zn.

3. A ceramic composition comprising a doped $(Ba,Ca)[Ti,Zr]O_3$, characterized in that a composition of a major portion corresponds to the formula $$(Ba_{1-x}Ca_x)(Ti_{1-a-b-c-y}Zr_yMn_aMo_bA_c)_kO_{3-\delta}$$

wherein:
$0.00 \leq x \leq 0.05$
$0.10 \leq y \leq 0.25$
$0.00 < a \leq 0.01$
$0.00 < b \leq 0.01$
$0.00 \leq c \leq 0.01$
$0.99 < k < 0.999$ and wherein A is at least one element selected from the group consisting of Y, Ho, Dy, Er, Yb, Ga, Ni, Mg, Zn and Al.

4. A ceramic composition as claimed in claim 3, characterized in that A is at least one member selected from the group consisting of Y, Ga and Zn.

5. A method of manufacturing ceramic multilayer capacitors, in which ceramic foils comprising a calcined doped $(Ba,Ca)[Ti,Zr]O_3$ are provided with screen-printed electrode layers which are mainly composed of Ni, whereafter the ceramic layers and the electrode layers are alternately stacked to form a multilayer structure which is and sintered in a reducing atmosphere, after which the multilayer structure is provided with electric connections, which are connected to a number of said electrode layers, characterized in that a composition of a major portion of the doped $(Ba,Ca)[Ti,Zr]O_3$ corresponds to the formula $$(Ba_{1-x}Ca_x)(Ti_{1-a-b-c-y}Zr_yMn_aMo_bA_c)_kO_{3-67}$$

wherein:
$0.00 \leq x \leq 0.05$
$0.10 \leq y \leq 0.25$
$0.00 < a \leq 0.01$
$0.00 < b \leq 0.01$
$0.00 \leq c \leq 0.01$
$0.99 < k < 0.999$ wherein $\delta$ is a deviation of a number of oxygen atoms from 3 and wherein A is at least one element selected from the group consisting of Y, Ho, Dy, Er, Yb, Ga, Ni, Mg, Zn and Al.

6. A method as claimed in claim 5, characterized in that A is at least one member selected from the group consisting of Y, Ga and Zn.

7. A method as claimed in claim 5, characterized in that the doped $(Ba,Ca)[Ti,Zr]O_3$ is prepared by mixing oxides and/or carbonates of used metals and calcining and milling a resultant mixture.

8. A method as claimed in claim 5, characterized in that the doped $(Ba,Ca)[Ti,Zr]O_3$ is prepared by means of a sol-gel process.

9. A method as claimed in claim 5, characterized in that $SiO_2$ is added to the calcined doped $(Ba,Ca)[Ti, Zr]O_3$.

10. A method as claimed in claim 6, characterized in that the doped $(Ba,Ca)[Ti,Zr]O_3$ is prepared by mixing oxides and/or carbonates of used metals and calcining and milling this a resultant mixture.

11. A method as claimed in claim 6, characterized in that the doped $(Ba,Ca)[Ti,Zr]O_3$ is prepared by means of a sol-gel process.

12. A method as claimed in claim 6, characterized in that $SiO_2$ is added to the calcined doped $(Ba,Ca)[Ti,Zr]O_3$.

13. A method as claimed in claim 7, characterized in that $SiO_2$ is added to the calcined doped $(Ba,Ca)[Ti,Zr]O_3$.

14. A method as claimed in claim 8, characterized in that $SiO_2$ is added to the calcined doped $(Ba,Ca)[Ti,Zr]O_3$.

* * * * *